(12) United States Patent
Mizutani et al.

(10) Patent No.: US 7,409,072 B2
(45) Date of Patent: Aug. 5, 2008

(54) CONTENT PROCESSING APPARATUS

(75) Inventors: Aritaka Mizutani, Osaka (JP); Michihiro Fujiyama, Kyoto (JP); Seiji Hashimoto, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 677 days.

(21) Appl. No.: 10/957,732

(22) Filed: Oct. 5, 2004

(65) Prior Publication Data
US 2005/0084242 A1  Apr. 21, 2005

(30) Foreign Application Priority Data
Oct. 15, 2003  (JP)  ............................. 2003-354879

(51) Int. Cl.
*G06K 9/00* (2006.01)
(52) U.S. Cl. ........................................ 382/100; 386/94
(58) Field of Classification Search ................ 382/100, 382/130; 380/5, 54, 201, 210, 252, 287, 380/22, 27; 386/94, 14, 16, 21, 32, 35, 37, 386/40, 66, 79, 86, 87, 103, 113; 360/60
See application file for complete search history.

(56) References Cited

U.S. PATENT DOCUMENTS 6,477,649 B2 * 11/2002 Kambayashi et al. ......... 726/27
6,493,013 B2 * 12/2002 Obata et al. .................. 347/139
2002/0052838 A1 * 5/2002 Yamada et al. ................ 705/39
2003/0133593 A1   7/2003 Tullberg et al.
2003/0161468 A1   8/2003 Iwagaki et al.
2003/0215217 A1 * 11/2003 Horii et al. ..................... 386/94

FOREIGN PATENT DOCUMENTS

| EP | 0 813 194 A2 | 12/1997 |
| EP | 1 335 365 A2 | 8/2003 |
| JP | 08-212115 | 8/1996 |
| JP | 8-212115 | 8/1996 |
| JP | 2002-215649 A1 | 8/2000 |
| WO | 03/040995 A2 | 5/2003 |
| WO | 03/047258 A1 | 6/2003 |

* cited by examiner

*Primary Examiner*—Abolfazl Tabatabai
(74) *Attorney, Agent, or Firm*—Arent Fox LLP (57) ABSTRACT

A content processing apparatus includes a clock circuit. The clock circuit counts time with reference to a first start-up time. A flash memory holds a storage period. A recording time based on a time of the clock circuit is embedded in a JPEG file to be recorded in a hard disk. When accepting an instruction to reproduce the JPEG file, a CPU calculates a boundary time based on a current time of the clock circuit and the storage period. Then, if the recording time of the JPEG file is earlier than the boundary time, the CPU disables a reproduction process of the JPEG file by a JPEG codec.

7 Claims, 10 Drawing Sheets

| INDEX (k) | ADDRESS |
|---|---|
| 0 | **** |
| 1 | **** |
| 2 | **** |
| ⋮ | ⋮ |

CONTENT PROCESSING APPARATUS

BACKGROUND OF THE INVENTION

1. Field of the Invention

The present invention relates to a content processing apparatus. More specifically, the present invention relates to a content processing apparatus that restricts an available period of a content.

2. Description of the Prior Art

These days, there is an increasing need for assigning a period of seven days, thirty days or the like to each of contents such as image data, audio data and computer software in order to impose an available-period restriction with which the content becomes unavailable after this period has passed since a first using time. For situations requiring the available-period restriction, for example, there are a case of charging for a content in providing it according to an available period and a case of restricting a storage period of a recorded image from a surveillance camera in recording it from a viewpoint of human rights protection, etc.

A prior art for applying the available period restriction as mentioned above is disclosed in Japanese Patent Laying-open No. H8-212115 laid-open on Aug. 20, 1996. According to this prior art, image files are stored in a hard disk (HD). A storage period is assigned to each of the image files, and, after the storage period has elapsed, the image file is deleted from the HD or is once read out from the HD, subjected to a compression process and an image quality degradation process, and stored again in the HD. Due to this, the image file whose available period has passed, cannot be reproduced at all or can be reproduced but viewed only with low image quality.

In the above prior art, however, whenever an image file whose available period has passed, comes into existence, it is necessary to perform a heavy process such as deleting or compressing the relevant image file. Thus, a heavy load is imposed especially in a case where a large number of files are handled.

SUMMARY OF THE INVENTION

Therefore, it is a primary object of the present invention to provide a novel content processing apparatus.

It is another object of the present invention to provide a content processing apparatus that makes it possible to restrict an available period of a content through a simple process.

A content processing apparatus according to claim 1 comprises a reproducer for reproducing a content, a clock for counting time with reference to an arbitrary time, a first memory for holding period information indicating an arbitrary period, and a restrictor for imposing a restriction on a reproduction process performed by the reproducer based on a time indicated by the clock and a period indicated by the period information held in the first memory.

The content is reproduced by the reproducer. The clock counts time with reference to the arbitrary time. The first memory holds the period information indicating the arbitrary period. The restrictor imposes a restriction on the reproduction process performed by the reproducer based on the time indicated by the clock and the period indicated by the period information held in the first memory.

The content becomes available only after it has been subjected to the reproduction process. Therefore, it is possible to restrict the available period of the content by imposing a restriction on the reproduction process performed by the reproducer on a time and period basis.

A content processing apparatus according to claim 1, and further comprises a recorder for recording a content in a recording medium. The restrictor disables reproduction of the content recorded in the recording medium earlier than a specific time precedent by the period to the time.

The recorder records a content in the recording medium. Out of the contents recorded in the recording medium, a content recorded in the recording medium earlier than the specific time precedent by the period to the time, is disabled by the restrictor from being reproduced.

The contents recorded in the recording medium are divided between non-reproducible contents and reproducible contents based on a positional relationship of a recording time and the specific time. More specifically, on an axis of time, the recording time is a fixed point and the specific time moves from past side to future side over time. Thus, at a point of time when the recording time of a certain content has been left behind by the specific time, the content becomes incapable of being reproduced and will never be reproducible again after that.

A content processing apparatus according to claim 3 is dependent on claim 1. The restrictor includes a second memory for holding the specific time, an arithmetic operator for periodically executing an arithmetic operation of subtracting the period held in the first memory from the time indicated by the clock, a judger for judging whether or not a result of the arithmetic operation performed by the arithmetic operator is larger in value than information held in the second memory, and an updater for updating the content held in the second memory according to the result of the arithmetic operation performed by the arithmetic operator when a result of judgment made by the judger is affirmative.

While the specific period is held in the second memory, the arithmetic operation of subtracting the period from the time is performed periodically, and it is judged whether the result of the arithmetic operation is larger in value than the information held in the second memory. Then, if the result of the judgment result is affirmative, the information held in the second memory is updated according to the result of the arithmetic operation performed by the arithmetic operator. As a result of this, no matter how the period held in the first memory is altered, the specific time held in the second memory is never changed to any smaller value than before, thereby making it possible to prevent a content that has once disabled to be reproduced from becoming reproducible again.

A content processing apparatus according to claim 2 is dependent on claim 1, and further comprises a changer for changing the period information held in the first memory.

By changing the period information in the first memory through the changer, the specific period can be shifted in a direction of future on the axis of time. As a result of this, it becomes possible to shorten the available period of the content.

A content processing apparatus according to claim 2 is dependent on claim 1, and further comprises an invalidator for performing an invalidating operation on the period information held in the first memory. The restrictor brings the updater to a halt when the invalidating operation has been performed.

When the period information in the first memory has been invalidated, the updater is brought to a halt. Accordingly, since the second memory is not updated, the specific time is maintained at a value immediately before the invalidating operation is performed. Therefore, after the invalidating operation has been performed, the contents recorded later than the specific time immediately before the invalidating operation become reproducible without limitation, while the contents recorded earlier than the specific time immediately before the invalidating operation never become reproducible.

A content processing apparatus according to claim 6 is dependent on claim 1. The recorder includes an assigner for periodically assigning the time indicated by the clock to contents recorded in the recording medium.

The time indicated by the clock is periodically assigned to the contents recorded in the recording medium.

A content processing apparatus according to claim 5 is dependent on claim 1. Once the clock has started counting time, changing the time from outside is disabled.

A content processing apparatus according to claim 6 is dependent on claim 7, and further comprises a time outputter for outputting time information provided to at least the reproducer. The clock counts time independently of the time outputter.

The time outputter outputs the time information, typically the time information based on a standard time. The time information shows a human-recognizable date and time (calendar time), and is used for timer-programmed recording.

The time of the time outputter can be generally changed, and needs to be changed if required, for example, for the purpose of correcting an error that may occur between it and the standard time. However, once the clock has started counting time, the time of the clock is disabled from being changed from outside and is never influenced even if the time of the time outputter is changed. If the time of the clock provided to the restrictor is changed, there is a possibility that the content once disabled from being reproduced may return to the reproducible state. However, this can be prevented according to claims 5 and 6.

A content processing apparatus according to claim 7 is dependent on claim 1, and further comprises a first supplier for supplying driving power based on a commercial power source to at least the clock, and a second supplier for supplying backup power to the clock when a supply from the commercial power source is interrupted.

The driving power based on the commercial power source is supplied by the first supplier to at least the clock, and the backup power is supplied by the second supplier to the clock when the supply from the commercial power source is interrupted. In the event that the clock comes to an halt, there is a possibility that the content may be reproduced even after the predetermined period has passed. Such a possibility can be decreased according to claim 7.

According to the present invention, by performing the simple process of imposing a restriction on the reproduction of a content based on the time of the clock and the period indicated by the period information, it is possible to restrict the available period of the content.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4(A) to FIG. 4(E) are illustrative views showing one example of an image deleting process according to the present invention in chronological order;

FIG. 5(A) to FIG. 5(E) are illustrative views showing another example of the image deleting process according to the present invention in chronological order;

DETAILED DESCRIPTION OF THE PREFERRED EMBODIMENTS

Figure 1:
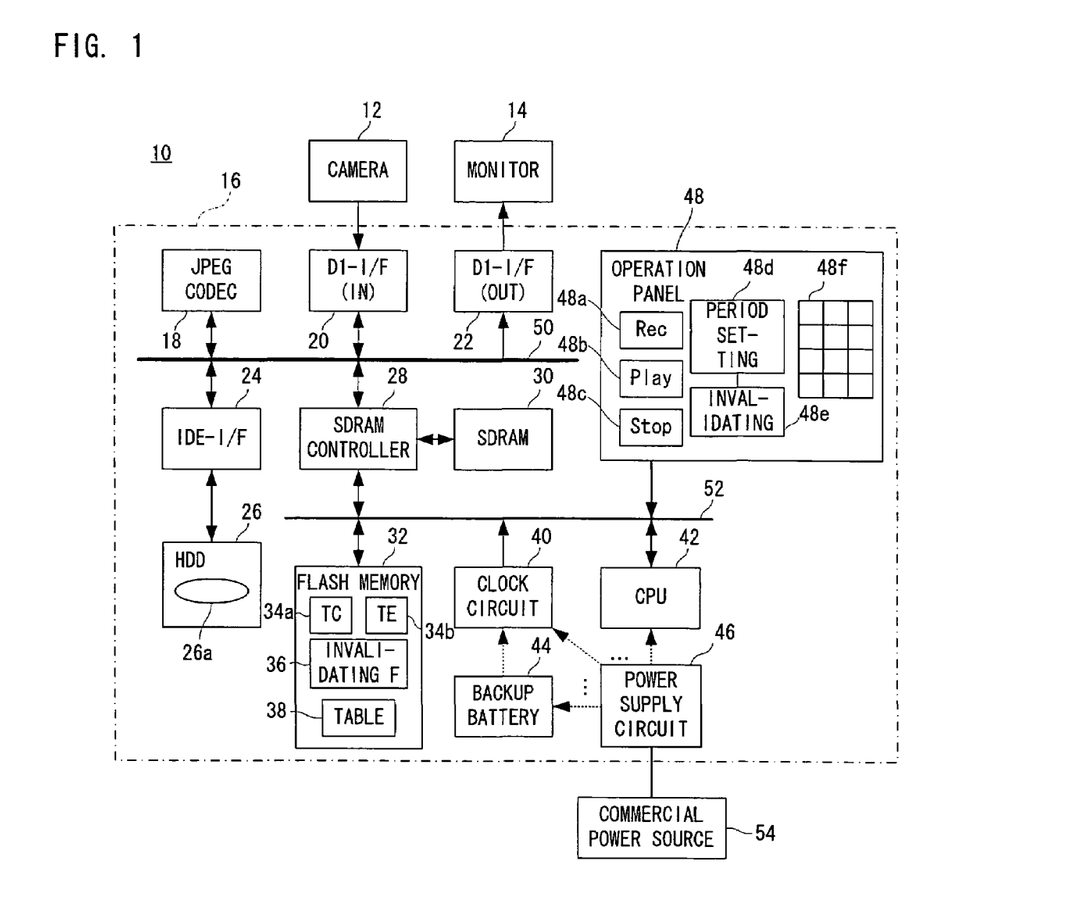
FIG. 1 is a block diagram showing a structure of one embodiment of the present invention.

Referring to FIG. 1, a surveillance camera system 10 of this embodiment is composed of a camera 12, a monitor 14, and a server 16. The camera 12 shoots an object scene and outputs an image signal to the server 16. The monitor 14 inputs the image signal from the server 16, and displays the object scene shot by the camera 12 on a screen.

The server 16 includes two data buses 50 and 52. The data bus 50 is connected to a JPEG codec 18, and the data bus 52 is connected to a CPU 42 and a flash memory 32.

The data bus 50 is further connected to an HDD 26 via an IDE-I/F 24, the camera 12 via an D1-I/F (IN) 20, and an SDRAM 30 via an SDRAM controller 28.

The data bus 52 is further connected to the SDRAM 30 via the SDRAM controller 28. The data bus 52 is also connected to a clock circuit 40 and an operating panel 48.

In the server 16, an image processing speed is improved by connecting the JPEG codec 18 to the data bus 50, not to the data bus 52 to which the CPU 42 is connected. Hardware on the data bus 50 side and hardware on the data bus 52 can exchange data with one another through the SDRAM controller 28.

Each of the above mentioned components of the server 16 is supplied with electric power by a power supply circuit 46 connected to a commercial power source 54. When a supply of power from the power supply circuit 46 is interrupted, a backup battery 44 supplies power to the clock circuit 40. The backup battery 44 is charged at all times with power from the power supply circuit 46, and is capable of continuously operating the clock circuit 40 for about thirty days even after the power circuit 46 has come to a stop.

Each of the components constituting the server 16 is described below.

The D1-I/F (IN) 20 converts an image signal from the camera 12 to a signal adapted to the data bus 50. The D1-I/F (OUT) 22 converts the image signal from the data bus 50 to a signal adapted to the monitor 14.

The IDE-I/F 24 controls the HDD 26 under instructions from the CPU 42. The HDD 26 records a data stream (JPEG file) from the data bus 50 in an HD 26a according to the control of the IDE-I/F 24, and reads the data stream from the HD 26a and outputs it to the data bus 50.

The SDRAM 30 includes a plurality of storage areas (banks). Image signals before being encoded and data streams obtained by encoding the signals are stored separately in the plurality of storage areas.

The SDRAM controller 28 writes image signals and data streams from the data bus 50 into the SDRAM 30, and outputs the image signals and data streams from the SDRAM 30 and outputs them to the data bus 50 or the data bus 52 under instructions from the CPU 42.

The JPEG codec 18 encodes an image signal input from the data bus 50 in a JPEG mode, and outputs a data stream obtained by encoding the signal to the data bus 50. It also decodes a data stream input from the data bus 50 in the JPEG mode, and outputs an image signal obtained by decoding the data stream to the data bus 50.

Next, the JPEG codec 18 forms a data stream (JPEG file) by arranging data blocks obtained through a decoding operation in predetermined order and attaching additional information such as a header, etc. to them. The additional information is stored in a block other than the one in which the data stream is stored. Incidentally, it is possible to store the additional information and the data stream in the same block.

Figure 3:
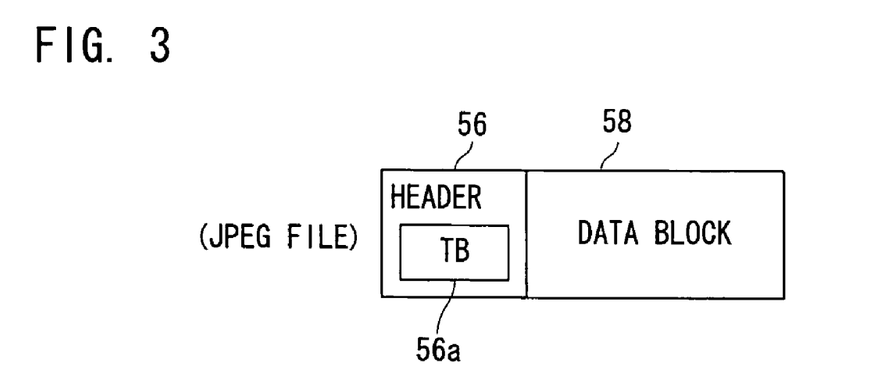
FIG. 3 is an illustrative view showing an example of a structure of a JPEG file.

A structure of a JPEG file formed by the JPEG codec 18 is shown in FIG. 3. Referring to FIG. 3, the JPEG file includes a header 56, a plurality of data blocks 58, 58, . . . A recording time (TB) 56a is embedded in the header 56. One JPEG file corresponds to one image frame.

The recording time 56a here is a time based on the clock circuit 40. The clock circuit 40 generally indicates a time different from a time of an internal clock of the CPU 42. That is, the internal clock of the CPU 42 is initially set to a value conforming to the standard time in a location of the server 16, and, after that, it may be also reset as necessary for the purpose of error correction or the like. On the contrary, the clock circuit 40 is initially set to "0" at the first start-up of the server 16, and, after that, it cannot be reset or does not allow a user to change the time. After the initial setting, the clock circuit 40 counts time in a predetermined unit with reference to an arbitrary time.

Incidentally, the above predetermined unit may be second, minute, hour or day. However, the larger a value of the unit becomes, the more widely the error increases. In this embodiment, time is counted by the minute with reference to a time 0.

In decoding a data stream, the JPEG codec 18 performs a process in the reverse of the above mentioned encoding operation.

It is noted that, although this embodiment adopts the JPEG mode, a JPEG 2000 mode or other encoding modes may be utilized. In either case, the recording time 56a is embedded in the header of the encoded data stream or the additional information area.

To return to the explanation of the components of the server 16, the flash memory 32 stores a storage period (TC) 34a, a boundary time (TE) 34b, an invalidating flag (F) 36, and a table 38. The storage period 34a, the boundary time 34b and the invalidating flag 36 are described later. The flash memory 32 further stores a program describing a process procedure of the CPU 42 (explained later).

Figure 2:
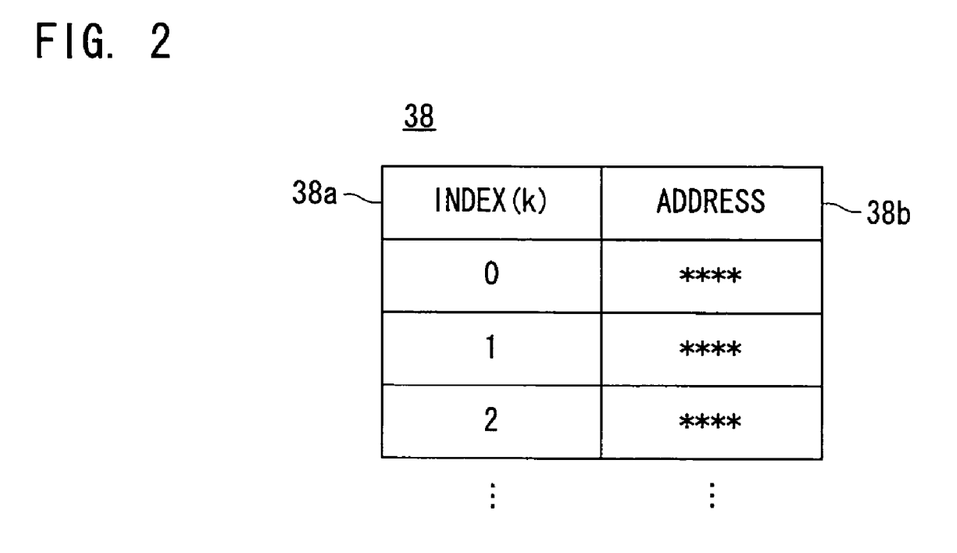
FIG. 2 is an illustrative view showing information in a table referred to at a time of reproduction.

One example of the table 38 is shown in FIG. 2. Referring to FIG. 2, the table 38, with respect to each of a plurality of JPEG files stored in the SDRAM 30 or the HD 26a, describes an index 38a identifying a file and an address 38b indicating the location of the file. For the index 38a, a number (k) assigned to each JPEG file when it is recorded is used, for example.

The operating panel 48 comprises a Rec key 48a, a Play key 48b, a Stop key 48c, a period setting key 48d, an invalidating key 48e, and a ten key 48f. The Stop key 48c includes a recording STOP key and a reproduction STOP key (neither illustrated). The ten key 48f includes 10 numeric keys and several symbol keys.

When one of the keys on the operating panel 48 is pressed, a signal corresponding to the pressed key is transmitted from the operating panel to the CPU 42.

The CPU 42 controls the above mentioned components in response to the signal from the operating panel 48 and in accordance with the program in the flash memory 32. This accomplishes various image processings in the server 16, such as image recording, image reproduction, and deletion of an image whose storage period has passed.

A concrete example of the image deletion process according to the present invention is explained below using FIG. 4(A) to FIG. 4(E) and FIG. 5(A) to FIG. 5(E).

Figure 4:
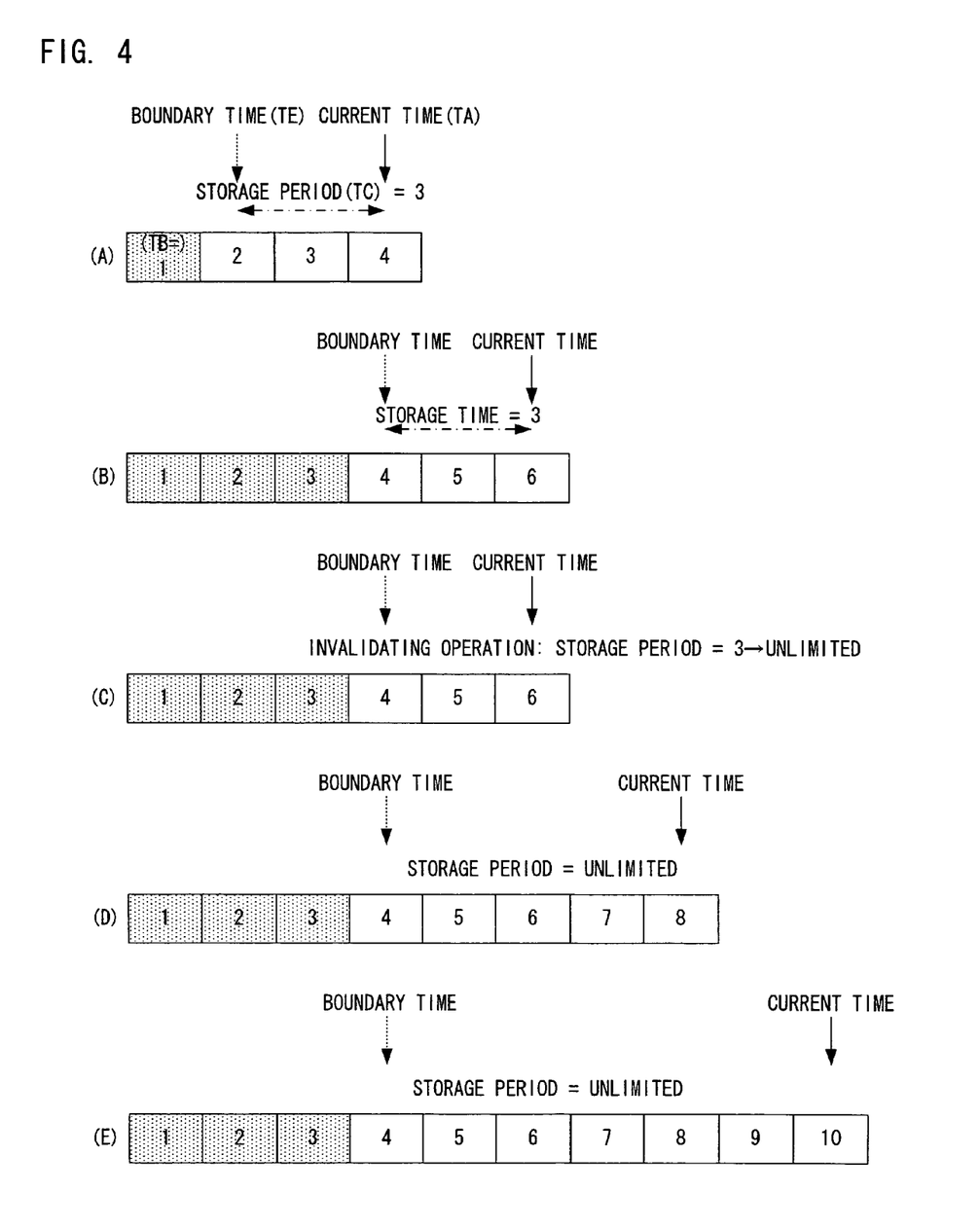

Referring to FIG. 4(A), when a current time (TA) is located at "4," the SDRAM 30 or the HD 26a stores four JPEG files (the recording time (TB)=1 to 4). Both the current time and recording time here are based on the time of the clock circuit 40. The predetermined storage period is "3," and a JPEG file "1" whose storage period has passed is in a deleted state. The wording "deletion" here is referred not to physically erasing a JPEG file in the SDRAM 30 or the HD 26a, but to disabling the decoding or reproducing of encoded data in the JPEG file from a reproduction software, for example.

More specifically, when instructed to reproduce a certain JPEG file, the reproduction software reads out the recording time 56a from the additional information area in this JPEG file. Then, the software cancels the decoding and reproducing processes of encoded data in the JPEG file if the read recording time 56a is out of the storage period, that is, the read recording time 56a is within a reproduction restricted period.

Whether the file should be deleted or not is determined in accordance with the boundary time (TE). The boundary time is found by subtracting the storage period (TC) from the current time.

Referring to FIG. 4(B), when the current time is located at "6," the SDRAM 30 or the HD 26a stores six JPEG files (TB=1 to 6). Since the storage period here is "3," the boundary time is located at "4" and the three files recorded earlier than this time (TB=1 to 3) are in the deleted state.

As can be seen from FIG. 4(A) and FIG. 4(B), the boundary time is located at a position earlier than the current time by a time equal to the storage period. With the progress of the current time, the boundary time shifts along a file row toward the future side while maintaining this time interval (=TC). When the boundary time moves in this way, the files left behind by the boundary time, i.e., files of TB<TE, are deleted.

Meanwhile, the predetermined storage period is invalidated as necessary. Referring to FIG. 4(C), when the current time is located at "6," the storage period of "3" is invalidated. At this moment, the boundary is located at the position of "4," and the three files of TB=1 to 3 are in the deleted state.

Referring to FIG. 4(D) and FIG. 4(E), after the invalidating operation has been performed, the storage period becomes unlimited. On the other hand, after the invalidating operation, the boundary time not becomes extinct but is fixed at "4," the position at the time of the invalidating operation. Accordingly, the three files of TB=1 to 3 are held in the deleted state even after the invalidating operation, and the files whose recording time is "4" or later are stored for an unlimited period unless the storage period is reset.

Next, a description is provided below concerning a process in a case where the storage period has been reset. In this case, the important point to note is that the boundary time never shifts from the current position toward the past.

Figure 5:
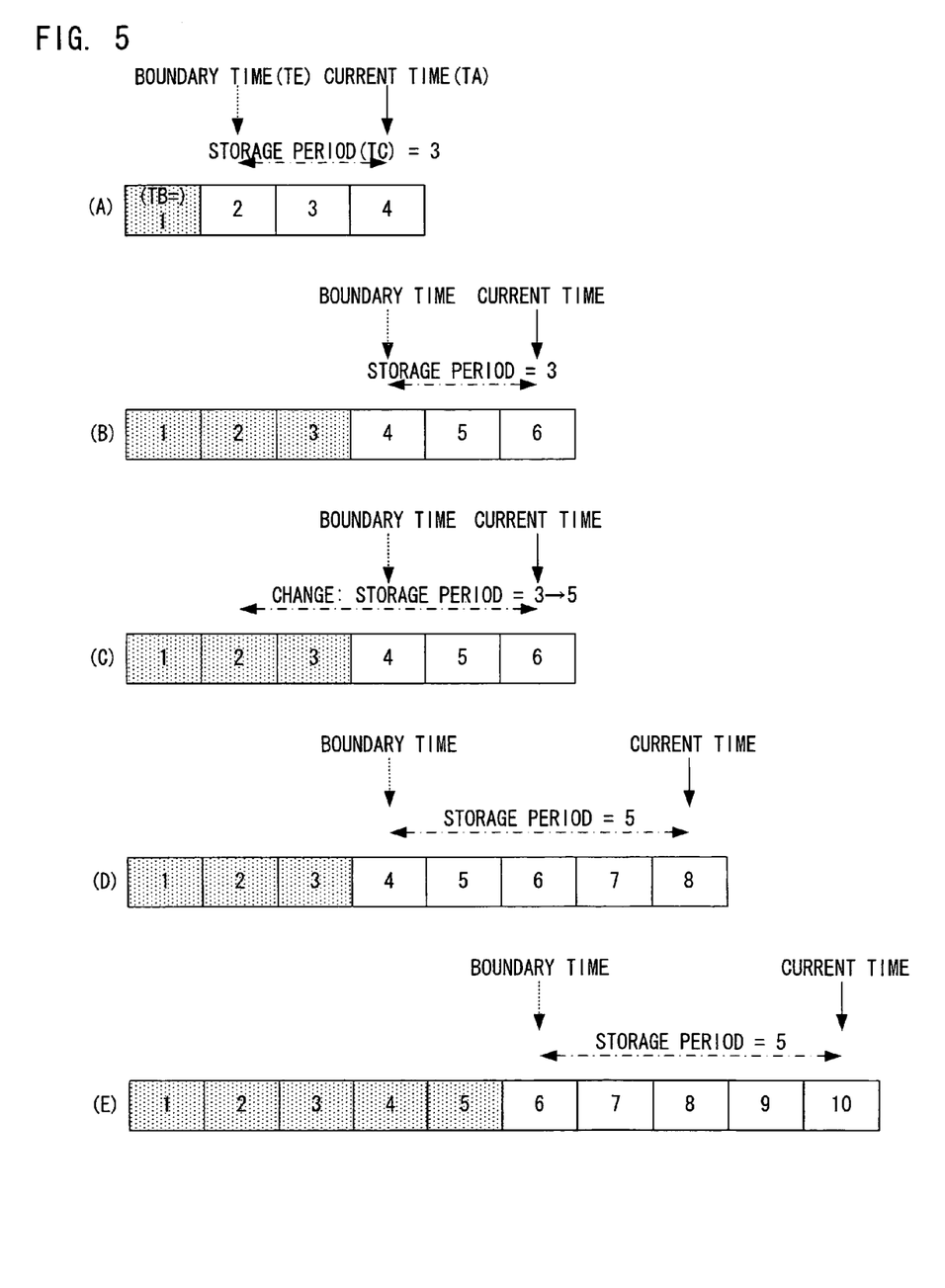

Referring to FIG. 5(A), when the current time is located at "4," the SDRAM 30 or the HD 26a stores four JPEG files (TB=1 to 4). The predetermined storage period is "3," and the boundary time is located at "2" at this moment. The one file recorded earlier than this time (TB=1) is in the deleted state.

Referring to FIG. 5(B), when the current time is located at "6," the SDRAM 30 or the HD 26a stores six JPEG files (TB=1 to 6). The predetermined storage period remains "3," and the boundary time is located at "4" at this moment. The three file recorded earlier than this time (TB=1 to 3) are in the deleted state.

Referring to FIG. 5(C), when the current time is located at "6," the storage period "3" is reset to "5." In one sense, when the storage period is changed to "5," the boundary time is supposed to move to "2," which thus cancels the deletion of the files of TB=2 and 3. However, since the boundary time does not move from the current position back toward the past, it stays at "4" that is the position immediately before the resetting operation. Therefore, the three files of TB=1 to 3 are continuously in the deleted state even after the changing of the storage period.

The boundary time can shift from the current position toward the future side. For example, when the current time is located at "6," if the storage period "3" is changed to "2," the boundary time moves from "4" to "5," which thus brings the three files of TB=1 to 3 plus a file of TB=4 into the deleted state (not illustrated).

Referring to FIG. 5(D), when the current time is located at "8," the SDRAM 30 or the HD 26a stores eight JPEG files (TB=1 to 8). At this moment, the storage period is "5" and the boundary time stays at "4." The three files recorded earlier than this time (TB=1 to 3) are in the deleted state.

Referring to FIG. 5(E), when the current time is located at "10," the SDRAM 30 or the HD 26a stores ten JPEG files (TB=1 to 10). At this moment, the storage period is "5" and the boundary time moves to "6." Accordingly, the five files recorded earlier than this time (TB=1 to 5) are in the deleted state.

As is evident from the above explanation, in the server 16 of this embodiment, a file that has been once deleted after the expiration of the storage period, never becomes reproducible again even if the storage period is invalidated or changed afterward.

A description is provided as follows regarding an entire operation of the surveillance camera system 10 constituted as described above, based on process flows of the CPU 42 shown in FIG. 6 to FIG. 11.

The surveillance camera system 10 is utilized at an office building and housing complex, for example. The camera 12 is installed at an entrance or passway, for example, and the server 16 and the monitor 14 are provided at a building manager room, for example. Incidentally, the camera 12 is not necessarily one unit. If a plurality of the cameras 12 are installed, each of the cameras 12, 12, . . . is connected to the D1-I/F (IN) 20 via a multiplexer not illustrated.

It is noted that, if required, the server 16 is also connected with terminals T1, T2, . . . (not illustrated) located inside and outside a building via an intranet or the Internet. Thus, a user can view supervisory images from not only the monitor 16 at the building manager room but also the outside terminals T1, T2, . . .

Supervisory images shot by the camera 12 are displayed in real-time through screens of the monitor and the terminals T1, T2, . . . while being recorded in the HD 26a. The supervisory images recorded in the HD 26a are stored for a predetermined period, and are deleted from the HD 26a after the period. The period during which the supervisory images are to be stored can be arbitrarily set by the user. In some countries and regions, a legal restriction is imposed on the period so as to limit it to seven days or thirty days, for example, from viewpoints of respect for privacy and protect of human rights.

Figure 6:
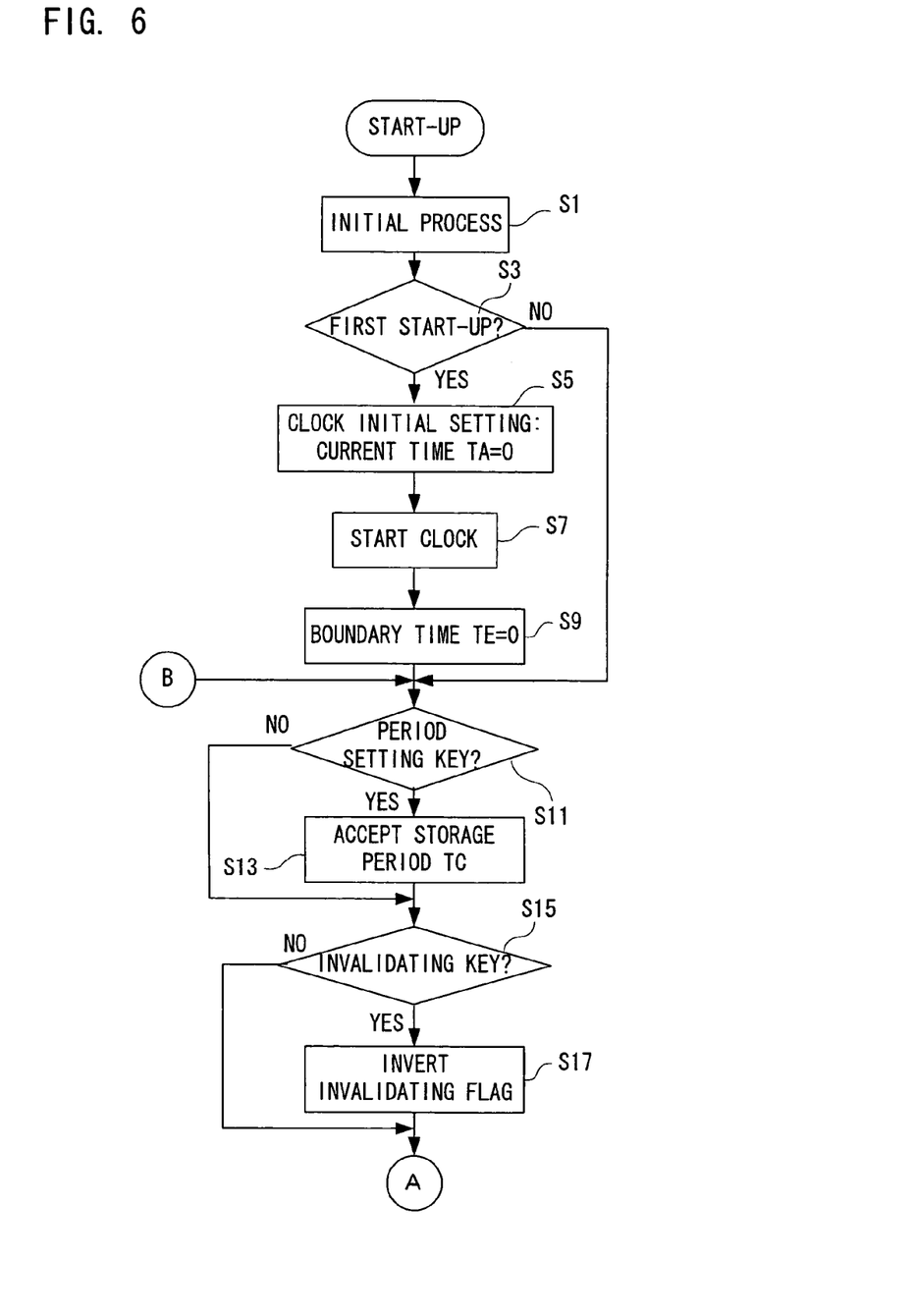
FIG. 6 is a flowchart showing one part of a process performed by a CPU.

More specifically, the CPU 42 performs processes shown by flowcharts in FIG. 6 to FIG. 11, according to the program in the flash memory 32. Referring to FIG. 6, when the server 16 is started, the CPU 42 performs an initial process in a step S1. The initial process includes instructing the SDRAM controller 28 to initialize the SDRAM 30 and assigning initial parameters to the JPEG codec 18.

In a step S3, the CPU 42 judges whether this start-up is the first start-up or not. If the judgment result is affirmative, the CPU 42 proceeds to a step S5. If negative, it moves to a step S11. The judgment in the step S3 is made by reviewing a recording status in the HD 26a, for example.

In the step S5, the CPU 42 initially sets the current time of the clock circuit 40 to "0." In a step S7, the CPU 42 starts the clock circuit 40. In a step S9, the CPU 42 sets the boundary time in the flash memory 32 to "0" as an initial value. After that, the CPU 42 proceeds to the step 11.

In the step S11, the CPU 42 judges whether the period setting key 48d has been pressed or not. If the judgment result is affirmative, the CPU 42 proceeds to a step S13. If negative, it moves to a step S15. In the step S13, the CPU 42 accepts the storage period, and then proceeds to the step S15. More specifically, if the period setting is required, the user firstly presses the period setting key 48d and then specifies a desired storage period from the ten key 48f. When recognizing the press of the period setting key 48d, the CPU 42 accepts a numeric value input from the ten key 48f, as the storage period.

It is noted that, in a case where a unit of the input value is different from a counting unit of the clock circuit 40, the input value is converted into a value based on the counting unit of the clock circuit 40 according to a predetermined conversion equation. If a value of "three days" is input, for example, since the counting unit of the clock circuit 40 is minute, the value is converted into "4,320 minutes" (=3×60×24).

In the step S15, the CPU 42 judges whether the invalidating key 48e has been pressed or not. If the judgment result is affirmative, the CPU 42 proceeds to a step S17. If negative, it goes to a step S19. In the step S17, the CPU 42 inverts the invalidating flag 36 in the flash memory 32. Then, the CPU 42 moves on to the step S19.

Figure 7:
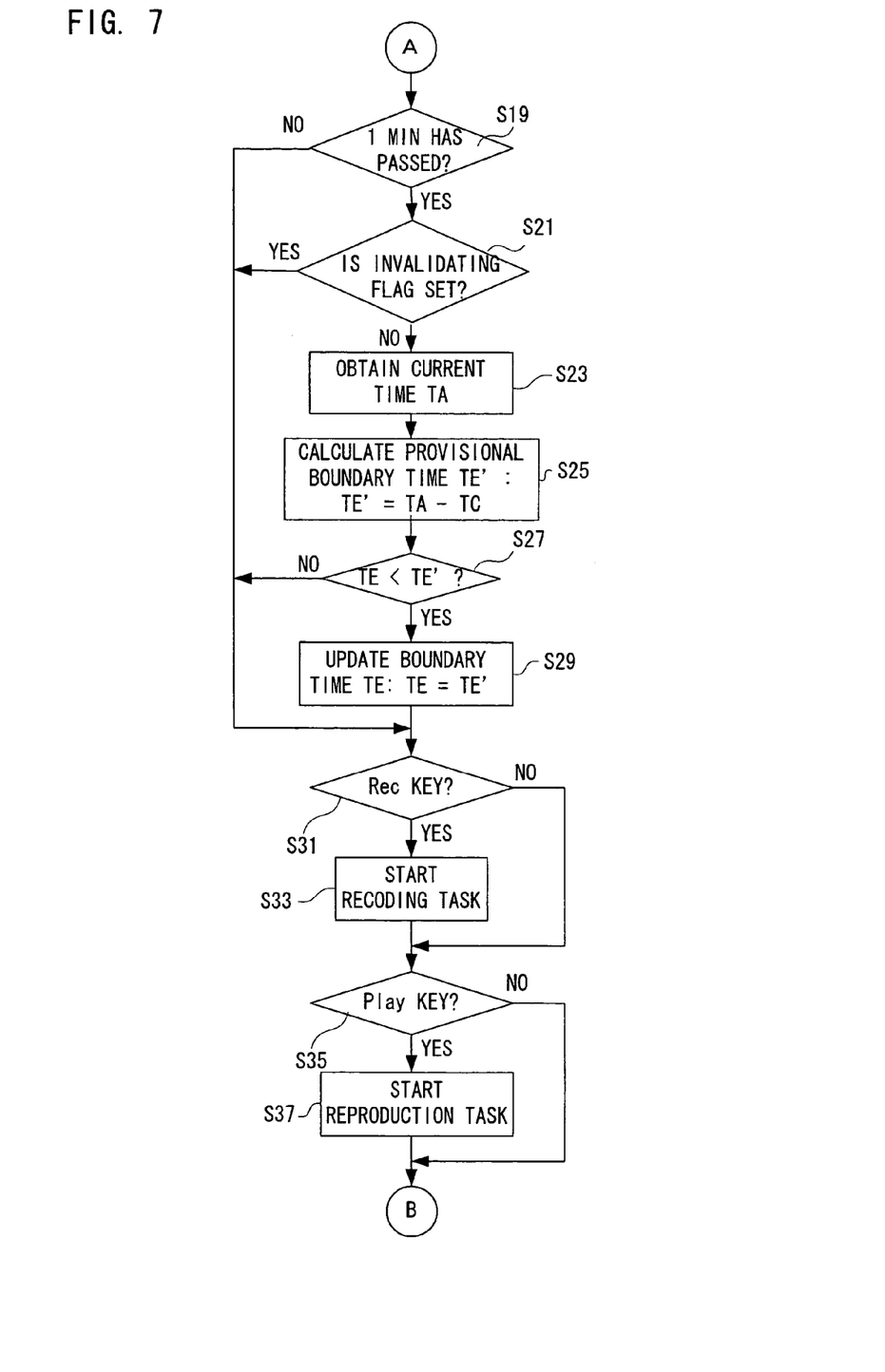
FIG. 7 is a flowchart showing another part of the process performed by the CPU.

Referring to FIG. 7, the CPU 42 judges whether one minute has passed or not in the step S19. The wording "one minute" here is a unit time of the clock circuit 40. If the judgment result is affirmative in the step S19, the CPU 42 proceeds to a step S21. If negative, it proceeds to a step S31. In the step S21, the CPU 42 judges whether the invalidating flag 36 is set or not. If the judgment result is affirmative, the CPU 42 proceeds to a step S23. If negative, it moves to the step S31.

In the step S23, the CPU 42 obtains the current time from the clock circuit 40. In a step S25, the CPU 42 calculates a provisional boundary time (TE') based on the storage period accepted in the step S13 and the current time read in the step S23. The provisional boundary time is determined by subtracting the storage period from the current time.

In a step S27, the CPU 42 judges whether or not the provisional boundary time calculated in the step S25 is later than the boundary time in the flash memory 32. If the judgment result is affirmative, the CPU 42 proceeds to a step S29. If negative, it proceeds to the step S31.

In a step S29, the CPU 42 updates the boundary time in the flash memory 32 according to the provisional boundary time calculated in the step S25. Then, the CPU 42 proceeds to the step S31.

In the step S31, the CPU 42 judges whether the Rec key 48a has been pressed or not. If the judgment result is affirmative, the CPU 42 proceeds to a step S33. If negative, it moves to a step S35.

In the step S33, the CPU 42 starts up a recording task (described later). Then, the CPU 42 moves to the step S35.

In the step S35, the CPU 42 judges whether the Play key 48b has been pressed or not. If the judgment result is affirmative, the CPU 42 proceeds to a step S37. If negative, it returns to the step S11.

In the step S37, the CPU 42 starts up a reproduction task (described later). Then, the CPU 42 returns to the step S11.

Next, an explanation is presented below regarding the above mentioned recording task started in the step S33. It is noted that, in this embodiment, a rate of image recording is one frame per thirty seconds for the sake of simplifying the explanation.

Referring to FIG. 1, an image signal output from the camera 12 is fetched into the server 16 through the D1-I/F (IN) 20, and then temporarily written into the SDRAM 30 by the SDRAM controller 28.

Figure 8:
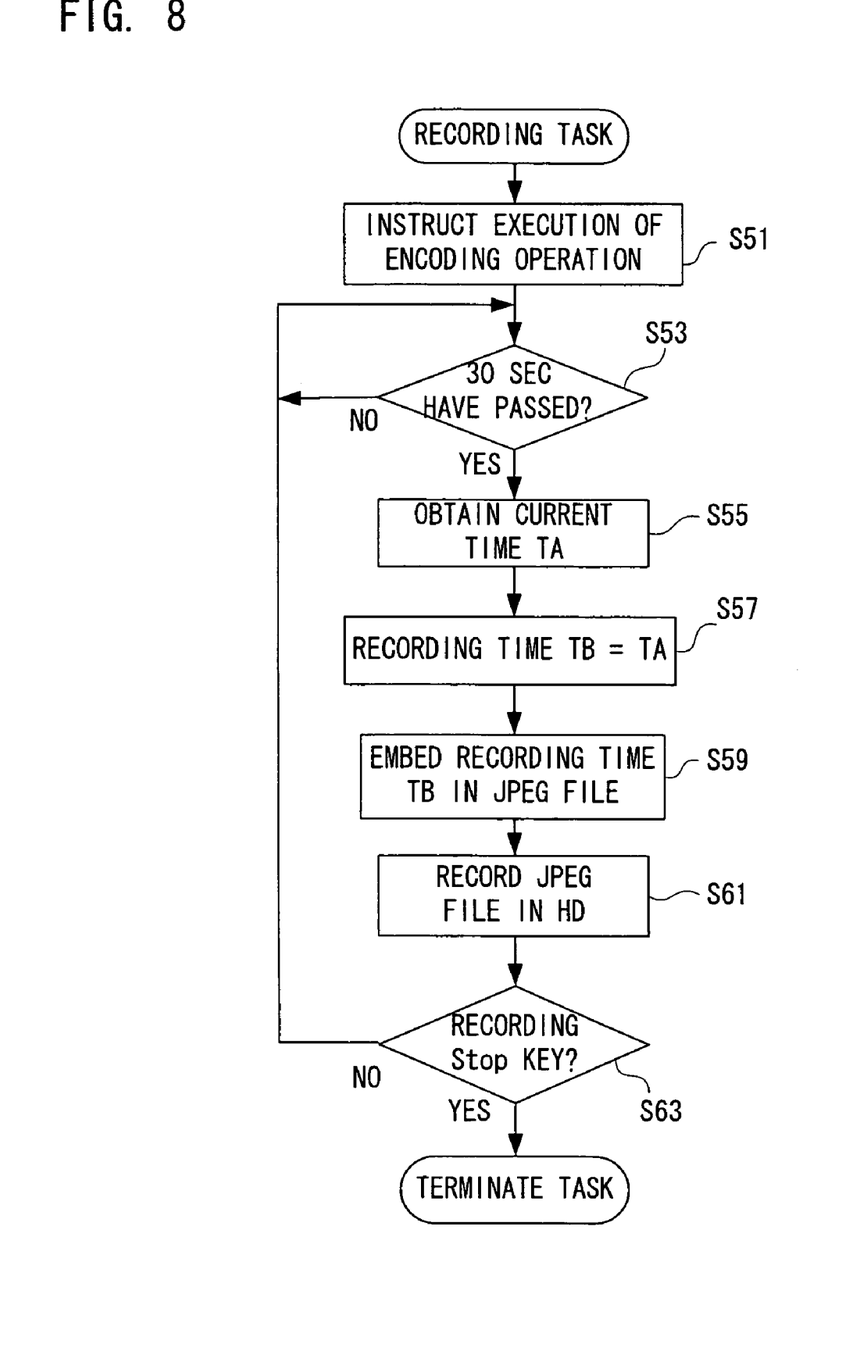
FIG. 8 is a flowchart showing still another part of the process performed by the CPU.

Referring to FIG. 8, the CPU 42 instructs the JPEG codec 18 to perform an encoding operation in a step S51. Accordingly, the JPEG codec 18 reads an image signal of one frame from the SDRAM 30 through the SDRAM controller 28, and encodes the read image signal in the JPEG mode. Then, the JPEG codec 18 forms a JPEG file by attaching a header to a bit stream resulting from the encoding operation. The JPEG file formed in this way is written again into the SDRAM 30 by the SDRAM controller 28.

In a step S53, the CPU 42 judges whether or not thirty seconds, i.e., a time equal to a recording cycle, have passed since the previous image recording. If the judgment result is affirmative, the CPU 42 proceeds to a step S55. If negative, it waits ready.

In the step S55, the CPU 42 obtains the current time from the clock circuit 40. In a step S57, the CPU 42 assigns the current time obtained in the step S55 to the recording time. In a step S59, the CPU 42 embeds the recording time assigned the current time into the header of the JPEG file stored in the SDRAM 30. The JPEG file obtained in this way is shown in FIG. 3.

In a step S61, the CPU 42 records the JPEG file with the recording time embedded into the HD 26a via the IDE-I/F 24. Then, the CPU 42 proceeds to a step S63.

In the step S63, the CPU judges whether the recording stop key 48c has been pressed or not. If the judgment result is affirmative, the CPU 42 terminates this task. If negative, it returns to the step S53 and repeats the same process as mentioned above.

Figure 9:
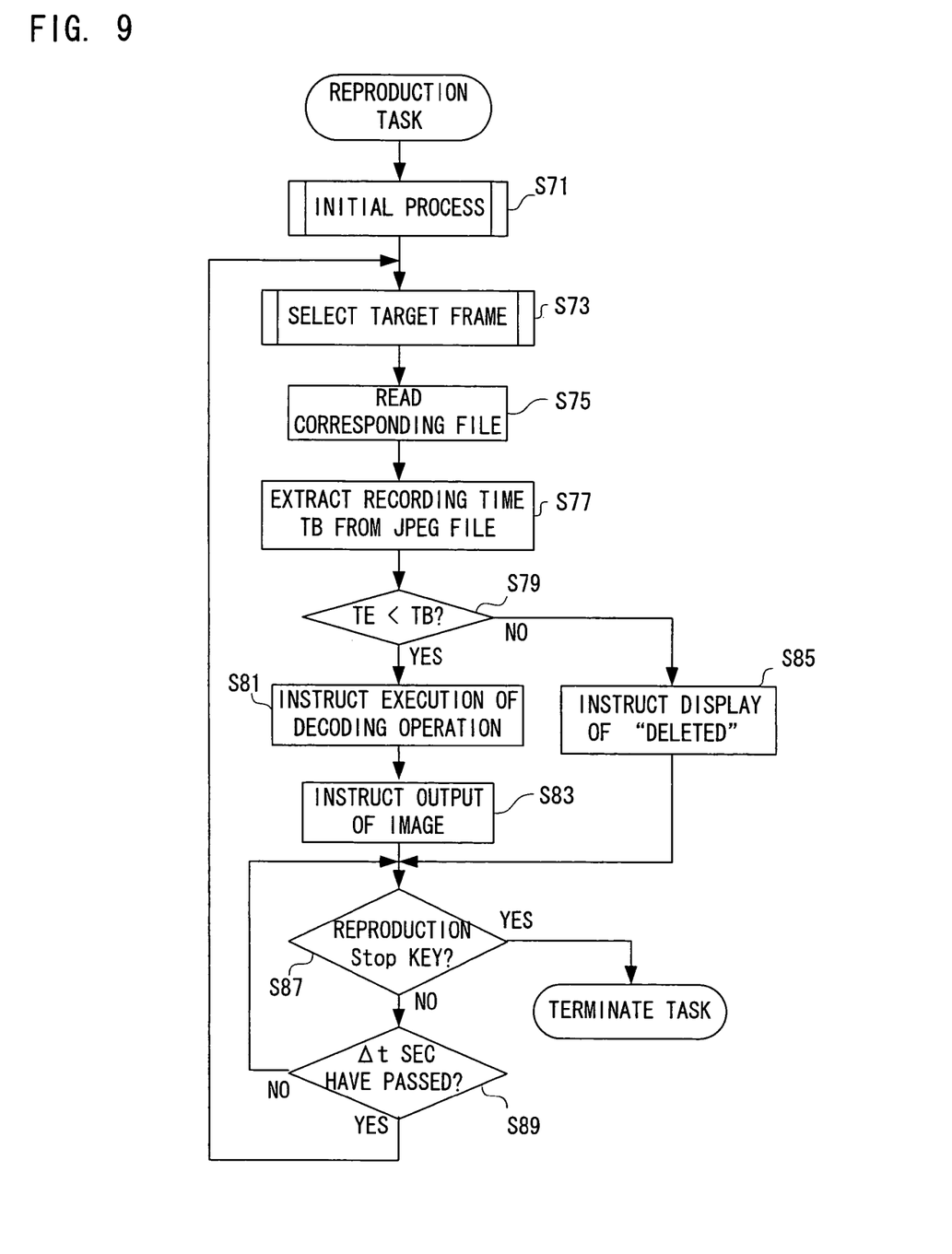
FIG. 9 is a flowchart showing yet another part of the process performed by the CPU.

Next, an explanation is given below regarding the above mentioned reproduction task started in the step S37. Referring to FIG. 9, the CPU 42 performs an initial process in a step S71. The initial process is described later.

In a step S73, the CPU 42 selects one frame to be subjected to a reproduction process that will be executed now. The frame selection process is explained later.

In a step S75, the CPU 42 reads a JPEG file corresponding to the frame (k) selected in the step S73, from the SDRAM 30 or the HD 26a in accordance with the table 38 in the flash memory 32 (refer to FIG. 2).

In a step S77, the CPU 42 extracts the recording time from the JPEG file read in the step S75. In a step S79, the CPU 42 judges whether or not the extracted recording time is later than the boundary time in the flash memory 32. If the judgment result is affirmative, the CPU 42 proceeds to a step S81. If negative, it proceeds to a step S85.

In the step S81, the CPU 42 instructs the JPEG codec 18 to execute a decoding operation. Accordingly, the JPEG codec 18 reads the relevant JPEG file from the SDRAM 30 through the SDRAM controller 28, and removes the header from the read JPEG file. Then, the JPEG codec 18 decodes a bit stream obtained by removing the header in the JPEG mode. An image signal obtained through the decoding operation is written again into the SDRAM 30 by the SDRAM controller 28.

In a step S83, the CPU 42 instructs the D1-I/F (OUT) 22 to output the image signal. Accordingly, the D1-I/F (OUT) 22 reads the image signal from the SDRAM 30 via the SDRAM controller 28, and outputs it to the monitor 14. In this way, a supervisory image shot by the camera 12 is displayed on the monitor 14. After providing the instruction, the CPU 42 executes a step S87.

In a step S85, the CPU instructs the D1-1F (OUT) 22 to display "DELETED". Image data corresponding to "DELETED" is stored in the flash memory 32 (not illustrated), for example. The D1-I/F (OUT) 22 outputs this image data to the monitor. Thus, "DELETED" is displayed on the monitor 14. After providing the instruction, the CPU 42 executes the step S87.

In the step S87, the CPU 42 judges whether the reproduction stop key 48c has been pressed or not. If the judgment result is affirmative, the CPU 42 terminates this task. If negative, it proceeds to the step a step S89.

In the step S89, the CPU 42 judges whether or not $\Delta t$ seconds have passed since the instruction in the step S81 was provided. Here, $\Delta t$ is a frame cycle and takes on different values depending on the reproduction mode (described later). If the judgment result is affirmative in the step S89, the CPU 42 returns to the step S73. If negative, it returns to the step S87.

Figure 10:
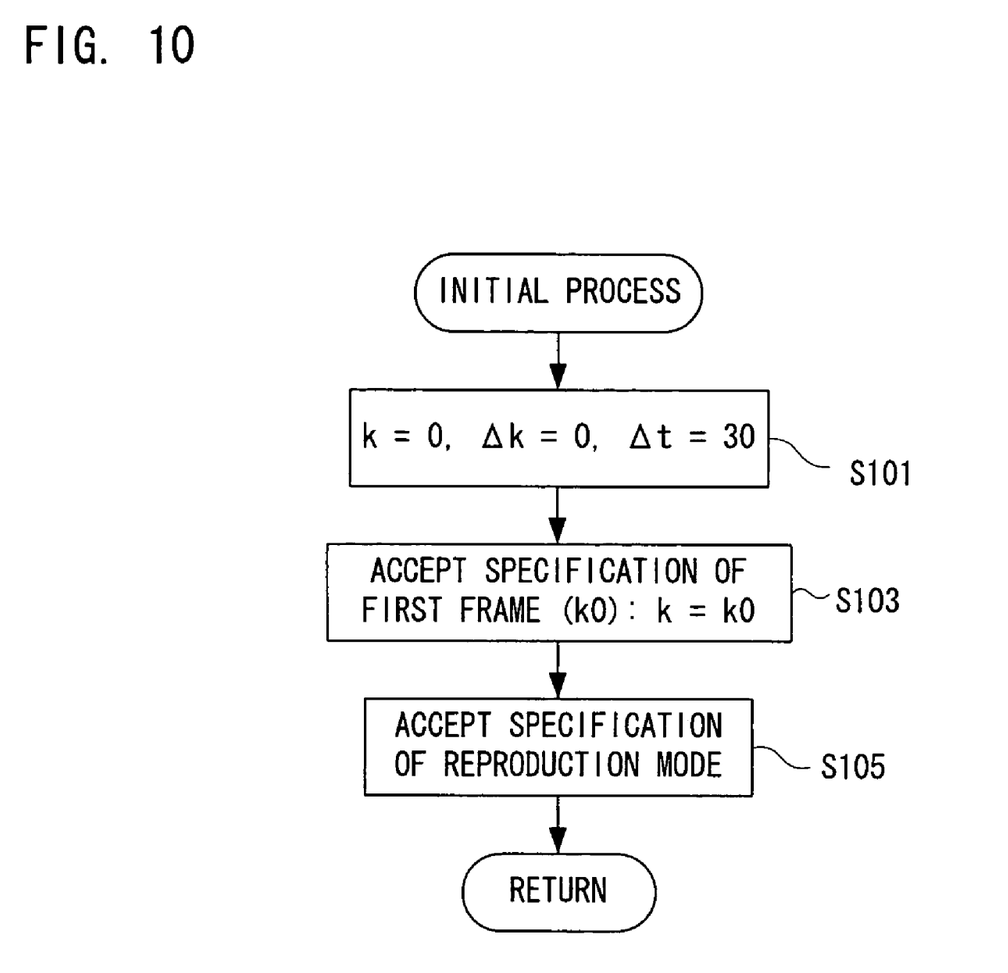
FIG. 10 is a flowchart showing another part of the process performed by the CPU.

Next, an explanation is presented as follows concerning the above mentioned initial process in the step S71. Referring to FIG. 10, the CPU 42 assigns 0 to a variable k and a variable $\Delta K$, and assigns 30 to a variable $\Delta t$ in a step S101. The variable k here denotes an index of a frame to be reproduced (refer to the step S73 in FIG. 9). The variable $\Delta k$ is a difference between the index of the current frame to be reproduced and the index of the next frame to be reproduced. As for the variable $\Delta t$, since the recoding rate is one frame per thirty seconds (refer to the step S53 in FIG. 8), a frame cycle of thirty seconds during normal reproduction is an initial value.

In a step S103, the CPU 42 accepts specification of the first frame. This specification is done by the user who inputs an index, i.e., a recording time from the ten key 48, for example. The index of the first frame here is "k0." The CPU 42 assigns k0 to the variable k.

In a step S105, the CPU 42 accepts specification of reproduction mode. This embodiment offers three modes of normal reproduction, high-speed reproduction and reverse high-speed reproduction. In the normal reproduction mode, frames constituting moving images are reproduced one by one in forward direction. In the high-speed reproduction, the frames are reproduced in forward direction in a ratio of one to five frames. In the reverse high-speed reproduction mode, the frames are reproduced in reverse direction in a ratio of one to three frames.

The user operates the ten key 48f to specify one of these three modes. After accepting the specification of the reproduction mode, the CPU 42 returns to a higher-layer routine.

Figure 11:
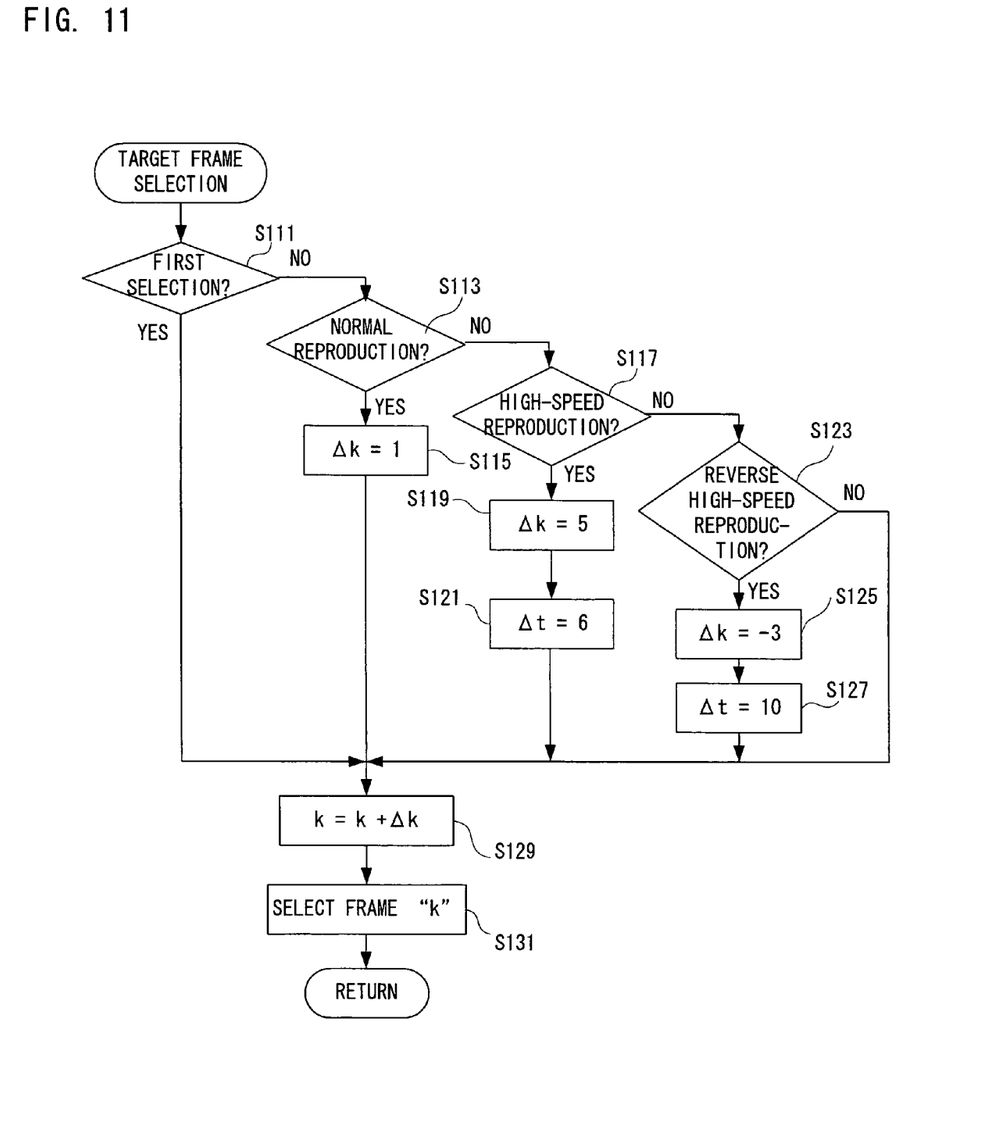
FIG. 11 is a flowchart showing still another part of the process performed by the CPU.

Next, an explanation is given below concerning the above mentioned frame selection process in the step S73. Referring to FIG. 11, the CPU 42 judges in a step S111 whether or not this is the first selection after the start-up of this task. If the judgment result is affirmative, the CPU 42 proceeds to a step S129. If negative, it proceeds to a step S113.

In the step S113, the CPU 42 judges whether the current reproduction mode, i.e., the mode accepted in the step S105 is normal reproduction or not. If the judgment result is affirmative, the CPU 42 proceeds to a step S115. If negative, it moves to a step S117. In the step S115, the CPU 42 assigns 1 to the variable $\Delta K$. Then, the CPU 42 goes on to a step S129.

In the step S117, the CPU 42 judges whether the current reproduction mode is high-speed reproduction or not. If the judgment result is affirmative, the CPU 42 proceeds to a step S119. If negative, it moves to a step S123. In the step S119, the CPU 42 assigns 5 to the variable $\Delta K$. In a step S121, the CPU 42 assigns 6 $\{=|30/5|\}$ to the variable $\Delta t$. After that, the CPU 42 proceeds to a step S129.

In the step S123, the CPU 42 judges whether the current reproduction mode is reverse high-speed reproduction or not. If the judgment result is affirmative, the CPU 42 proceeds to a step S125. If negative, it proceeds to the step S129. In the step 125, the CPU 42 assigns -3 to the variable $\Delta k$. In a step S127, the CPU 42 assigns 10 $\{=|30/(-3)|\}$ to the variable $\Delta t$. Then, the CPU 42 proceeds to the step S129.

In the step S129, the CPU 42 assigns $\{k+\Delta K\}$ to the variable k. In a step S131, the CPU 42 selects a frame k, i.e., a frame whose index matches the value assigned to the variable k, as a target frame.

As can be seen, in this embodiment, the clock circuit 40 counts time with reference to the first start-up time of the server 16 and stores the storage period in the flash memory 32. The recording time based on the time of the clock circuit 40 is embedded in a JPEG file stored in the HD 26a. At the time of reproduction, the CPU 42 calculates the boundary time from the time of the clock circuit 40 and the storage period. Then, if the recording time of the JPEG file is earlier than the boundary time, the CPU 42 disables the reproduction process of the JPEG file by the JPEG codec 18 and the SDRAM controller 28. In this way, the available period of the JPEG file can be restricted by the simple process.

It is noted that, although the recording rate is fixed for one frame per thirty seconds in this embodiment, a plurality of recording rates such as sixty frames per second, thirty frames per second, . . . , one frame per fifteen seconds and one frame per thirty seconds, for example, may be prepared so as to select one of them at the time of image recording. In this case, in the step S53 of the recording task (refer to FIG. 8), it is judged whether the reciprocal of the selected recording rate, i.e., a time equal to the recording cycle (shown as $\Delta T$) has passed or not.

Meanwhile, in the reproduction task, a step of detecting the recording cycle $\Delta T$ of the selected frame is added immediately after the step S131. Also in the step S121, the variable $\Delta k$ is assigned $\{|\Delta T/\Delta k|\}$. This is the same as the step S127.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content processing apparatus, comprising:
   a reproducer for reproducing a content;
   a clock for counting time with reference to an arbitrary time;
   a first memory for holding period information indicating an arbitrary period;
   a recorder for recording a content in a recording medium; and
   a restrictor for imposing a restriction on a reproduction process performed by said reproducer based on a time indicated by said clock and a period indicated by the period information held in said first memory, said restrictor disabling reproduction of the content recorded in said recording medium earlier than a specific time precedent by said period to said time, wherein
   said restrictor includes a second memory for holding said specific time, an arithmetic operator for periodically executing an arithmetic operation of subtracting the period held in said first memory from the time indicated by said clock, a judger for judging whether or not a time shown by a result of the arithmetic operation performed by said arithmetic operator after said specific time is held in said second memory, and an updater for updating the information held in said second memory according to the result of the arithmetic operation performed by said arithmetic operator when a result of judgment made by said judger is affirmative.

2. A content processing apparatus according to claim 1, further comprising a changer for changing the period information held in said first memory.

3. A content processing apparatus according to claim 1, further comprising:
   an invalidator for performing an invalidating operation on the period information held in said first memory, wherein
   said restrictor brings said updater to a halt when said invalidating operation has been performed.

4. A content processing apparatus according to claim 1, wherein
   said recorder includes an assigner for periodically assigning the time indicated by said clock to contents recorded in said recording medium.

5. A content processing apparatus according to claim 1, wherein
   once said clock has started counting time, changing the time from outside is disabled.

6. A content processing apparatus according to claim 5, further comprising:
   a time outputter for outputting time information provided to at least said reproducer, wherein
   said clock counts time independently of said time outputter.

7. A content processing apparatus according to claim 1, further comprising:
   a first supplier for supplying driving power based on a commercial power source to at least said clock; and
   a second supplier for supplying backup power to said clock when a supply from said commercial power source is interrupted.

* * * * *